Nov. 1, 1966   R. W. EBACHER ETAL   3,281,969
SATELLITE ORBITAL MONITOR

Filed Oct. 22, 1965   3 Sheets-Sheet 1

INVENTORS-
RUDOLPH W. EBACHER,
DONALD M. FERGUSON,
ARMANDO MANCINI,
LYNDON L. SHELDON,
BERNARD S. WILSON and
BY THEODORE E. WIRTANEN.
Harry A. Herbert Jr
Arsen Tashjian
ATTORNEYS Nov. 1, 1966  R. W. EBACHER ETAL  3,281,969
SATELLITE ORBITAL MONITOR
Filed Oct. 22, 1965  3 Sheets-Sheet 2

INVENTORS.
RUDOLPH W. EBACHER,
DONALD M. FERGUSON,
ARMANDO MANCINI,
LYNDON L. SHELDON,
BERNARD S. WILSON and
THEODORE E. WIRTANEN BY Harry A. Herbert Jr
Arsen Tashjian
ATTORNEYS Nov. 1, 1966   R. W. EBACHER ETAL   3,281,969
SATELLITE ORBITAL MONITOR
Filed Oct. 22, 1965   3 Sheets-Sheet 3

INVENTORS–
RUDOLPH W. EBACHER,
DONALD M. FERGUSON,
ARMANDO MANCINI,
LYNDON L. SHELDON,
BERNARD S. WILSON and
THEODORE E. WIRTANEN BY Harry A. Herbert Jr.
Arsen Tashjian
ATTORNEYS

United States Patent Office 3,281,969
Patented Nov. 1, 1966

3,281,969
SATELLITE ORBITAL MONITOR
Rudolph W. Ebacher, Bedford, and Donald M. Ferguson, Marblehead, Mass., Armando Mancini, Fairfax, Va., Lyndon L. Sheldon, Charleston AFB, S.C., and Bernard S. Wilson, Cambridge, and Theodore E. Wirtanen, Chelmsford, Mass., assignors to the United States of America as represented by the Secretary of the Air Force
Filed Oct. 22, 1965, Ser. No. 502,725
2 Claims. (Cl. 35—46)

This is a continuation-in part of application Serial No. 328,765, filed December 6, 1963, now abandoned.

The invention described herein may be manufactured by or for the United States Government for governmental purposes without payment to us of any royalty thereon.

This invention relates to a means for monitoring and displaying on a reduced scale, the motion of an object as it moves with respect to the earth. More particularly, the invention is concerned with providing laboratory apparatus which is capable of visually simulating the relationships between the earth and the motions of moving objects, such as artificial satellites, especially with respect to "night" and "day" as they occur on earth.

In the use of artificial satellites for scientific research, such as in geodesy, communications research, and in many other fields, it is necessary to coordinate the activities of research groups located at widely distributed positions on the earth's surface based on the position of the satellite at any particular instant. This can be accomplished by computers, so-called "electronic brains," which produce lengthy tabulations of data for interpretation and plotting by scientific personnel. However, it is extremely difficult to visualize the phenomenon which these data represent because of the constantly changing relative positions of both the satellite and the earth which determines, among other things, whether the satellite is passing through daylight or darkness as it circles the earth. This is very important in the visual observation of orbiting satellites because, generally speaking, the satellite can best be seen during the twilight and early dawn periods.

Accordingly, it is an object of the present invention to provide a three dimensional representation of the position which a satellite in orbit will assume with respect to the earth at any given instant.

Another object of the invention is to present a visual indication of the satellite in its proper relationship to day and night as it occurs on earth. This is accomplished by providing apparatus for simulating sunlight and darkness during the passage of time.

A further object of the present invention is to provide means for simulating the time for sequential occurrence of a particular satellite-earth relationship by varying the speed of the moving elements of the apparatus. This feature allows visual observations of the corresponding positions of the satellite and the earth as they will occur in the future and also allows for the return of the apparatus to synchronism with the events as they occur in "real time" in outer space.

Still another object of the invention is to eliminate the need for constantly plotting on charts or using lengthy tables in order to determine the instantaneous position of the satellite as it orbits the earth. This feature is particularly useful when it is necessary or desirable to determine whether the satellite is in the daylight or night phase.

A still further object of the invention is to provide a satellite monitor which can be adapted by adjustment or inclination to simulate the periodic revolution of the satellite around the earth regardless of the direction and time interval of each orbit.

Still another object of the invention is to provide apparatus which shows the "real time" at various check points on earth as related to the satellite in orbit, thereby permitting the simple and accurate determination of the exact time at which the satellite will pass over any of the particular check points. This feature, when used in conjunction with the day or night inner globe, will give a precise indication of the time and place that the satellite will be visible from earth.

These and other objects, features, and advantages will become more apparent from the following description taken in conjunction with the accompanying drawings wherein.

Figure 1:
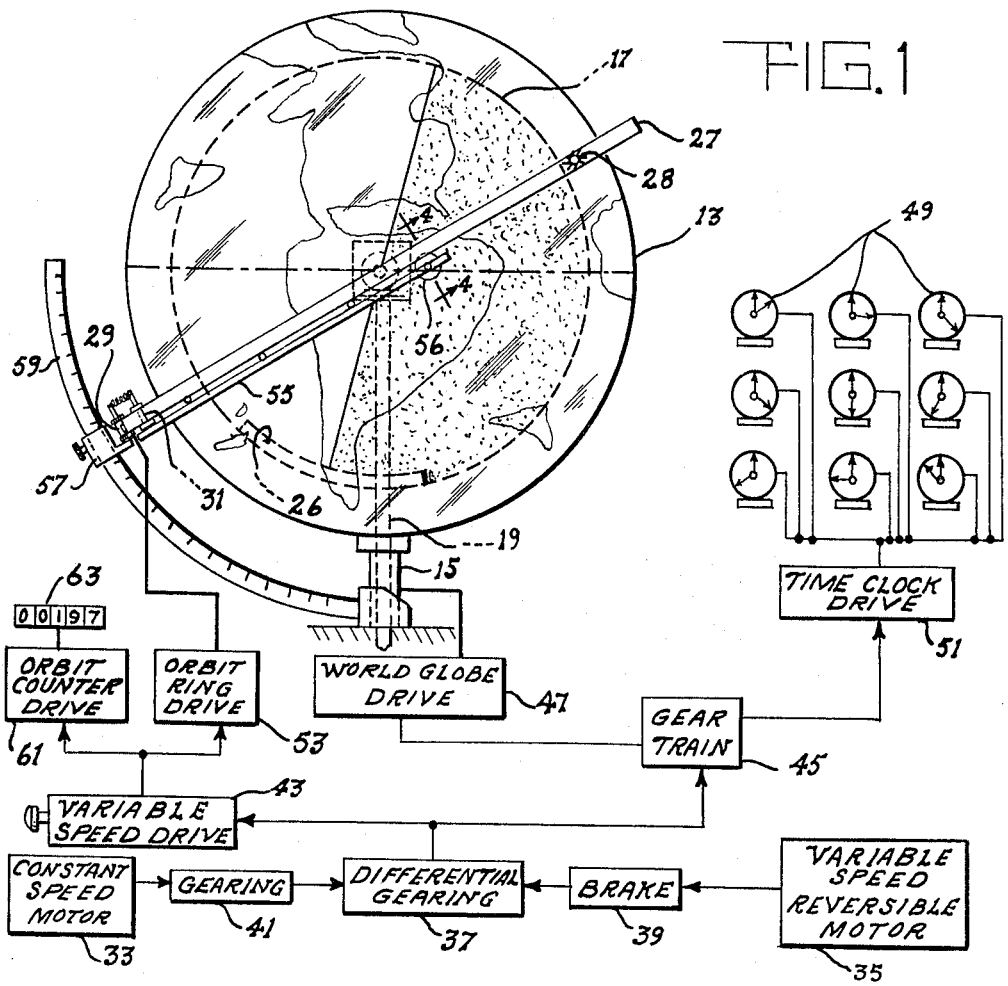
FIG. 1 is a block diagram illustrating the system for controlling the movement of the various elements of the invention and diagrammatic representation of the earth and satellite relationship.
Figure 4:
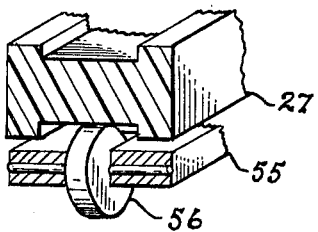
FIG. 4 is a sectional view along the line 4—4 of FIG. 1 showing the support arrangement for portions of the satellite ring.

Referring now to the drawings in which like reference characters are used to refer to like parts throughout the specification, the invention includes a transparent globe 13 representing the earth with the land masses depicted thereon. A vertically oriented hollow shaft 15 is attached at the south polar region of the earth globe 13 and is arranged to provide rotation along the polar axis by driving the sprocket 16. Under normal operating conditions the earth globe 13 rotates once every twenty-four hours. Inside the transparent geographical globe 13 is an inner sphere 17 painted half white to simulate the area of the earth on which the sun is shining and half black to simulate the darkened areas of the earth. The inner sphere 17 is adapted to be adjusted to compensate for the seasons of the year by rotating the handle 18 which turns the shaft 19 and the gear 21 attached thereto causing the gear 23 to rotate the shaft 25 a corresponding amount thereby tilting the inner sphere 17 with respect to the transparent globe 13. A slot 26 which is dimensioned wider than the diameter of shaft 19 is provided in the lower portion of the inner sphere 17 allowing a 23° tilt in either direction from vertical. Since the globe 13 is rotating once every twenty-four hours, the condition of light or darkness can be visually determined for any point on earth by simply observing the color of the inner sphere 17 under the particular point on the transparent globe 13.

A revolving satellite ring 27 having a spot 28 represents the position of the satellite as it orbits around the earth. The satellite ring 27 is driven by the drive rollers 29 which provides rotation about the earth of the ring 27 at a speed equal to the speed of the satellite. A corresponding pair of guide rollers 31 are provided for the purpose of guiding the satellite ring 27 in its proper path and retaining frictional pressure against the drive rollers 29 to prevent slippage.

The drive mechanism for the satellite orbital monitor includes two electric motors. The first is a constant speed synchronous motor 33 which serves to provide the power for driving the various elements at their corresponding relative speeds which are comparable to the actual speeds of the earth rotation and satellite orbit. A variable speed reversible motor 35 is provided with suitable controls for varying the speed in either rotational direction and is connected through a differential 37 to the driven elements. The constant speed motor 33 is likewise connected to the differential 37 and, with both motors operating simultaneously, the overall effect is to add or subtract the speed of the variable motor 35 to or from the speed of the synchronous motor 33, thereby providing a means for speeding up and reversing the occurrence of various relative positions of the satellite with respect to the earth.

As a practical matter, it is desirable to introduce the brake 39 between the variable speed motor 35 and the differential 37 so that the connecting shaft will not rotate during prolonged periods of constant speed operation. It is also desirable to accomplish some speed reduction between the constant speed motor 33 and the differential 37. Accordingly, the gearing 41 is introduced between these elements to obtain the desired speed ratio.

Having obtained an integrated speed from the motors 33 and 35 through the differential 37, the motion is then transmitted to two separate drive elements, namely, the variable speed drive 43 and the gear train 45 to obtain two distinct motions. The first motion involves the rotation of the earth globe 13 about its polar axis. This is accomplished by transmitting the motion from the gear train 45 through the world globe drive 47 to the vertically oriented hollow shaft 15. Under normal operating conditions the earth globe 13 revolves once every twenty-four hours in imitation of the earth's rotation and is driven by the synchronous motor 33 only. If it is desired to speed up or reverse the direction of the earth's rotation, the brake 39 is released and motion from the variable speed reversible motor 35 is integrated by means of the differential 37 with the motion from the synchronous motor 33 allowing any reasonable forward or reverse rotational speed to be obtained. A series of time clocks 49 are energized by the time clock drive 51 which in turn receives its motion from the gear train 45. These clocks 49 can be set to represent the actual time of day at various points on the earth's surface. Once set, the clocks 49 will maintain their respective time with relation to the earth's rotation as it is speeded up, slowed down or reversed because the gear train 45 which provides the motion is common to both the earth globe 13 and the clocks 49.

Figure 2:
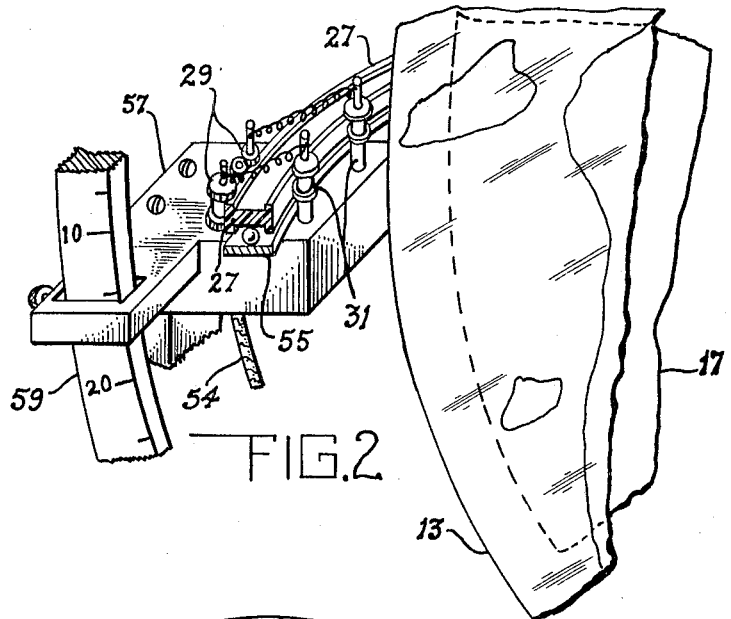
FIG. 2 is a detail view in perspective of the satellite ring drive mechanism.

Simultaneously, the variable sped drive 43, which receives its motion from the differential 37, provides a second motion for revolving the satellite ring 27 around the earth globe 13. This is accomplished by transmitting motion through the orbit ring drive 53 to the drive rollers 29 by means of a flexible cable 54 (shown in FIG. 2). A support arm 55 having a ball bearing 56 operably disposed at its outer limit operates to maintain the outer portions of the satellite ring 27 in orbital alignment. The motion of the satellite ring 27, as it revolves around the earth, operates to simulate the action of a satellite in orbit when the spot 28 is considered to represent the satellite. The angle of the satellite ring 27 can be varied with respect to the equator line as shown on the earth globe 13 from a zero degree angle concentric with the equator and in the same plane to an angle of seventy degrees with respect to the equator line. This is accomplished by sliding the support block 57 along the arcuate orbital ring support member 59 and permits the simulation of the paths of all satellites normally used for research with the exception of those in near polar orbit.

The variable speed drive 43, previously mentioned as providing the motion for driving the satellite ring 27, is useful to vary the rotational speed thereof in a controlled manner from one rotation in sixty minutes to one rotation in one hundred eight minutes and may be maintained at any speed between these limits. This covers the range of orbital speeds of normally operating research satellites launched to date. An orbital counter drive 61 drives a mechanical counter 63 which records the number of orbits made by the satellite around the earth.

Figure 3:
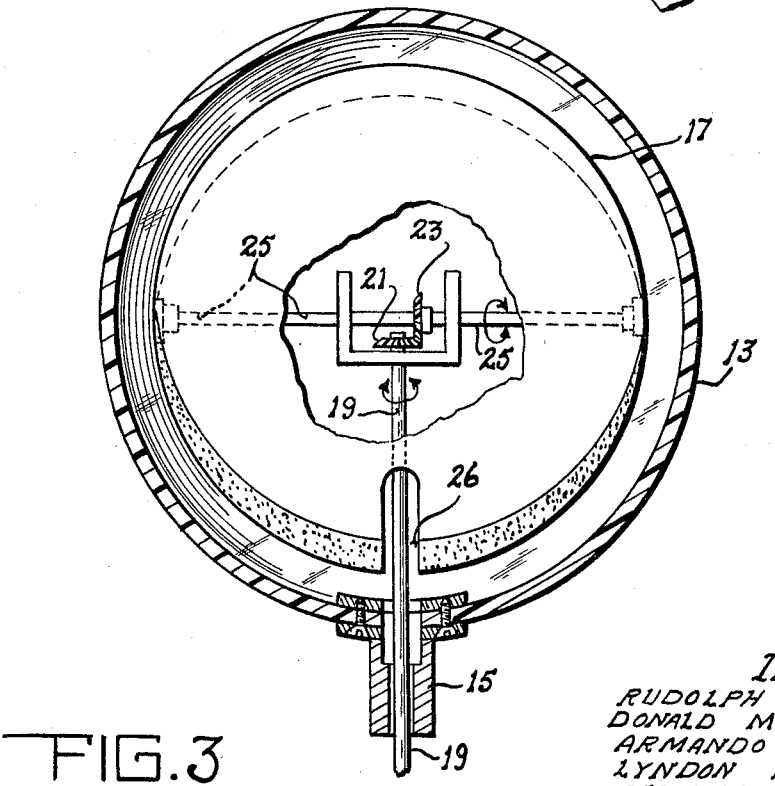
FIG. 3 is a view in partial section showing the day and night inner globe with the adjusting means for seasonal compensation.
Figure 5:
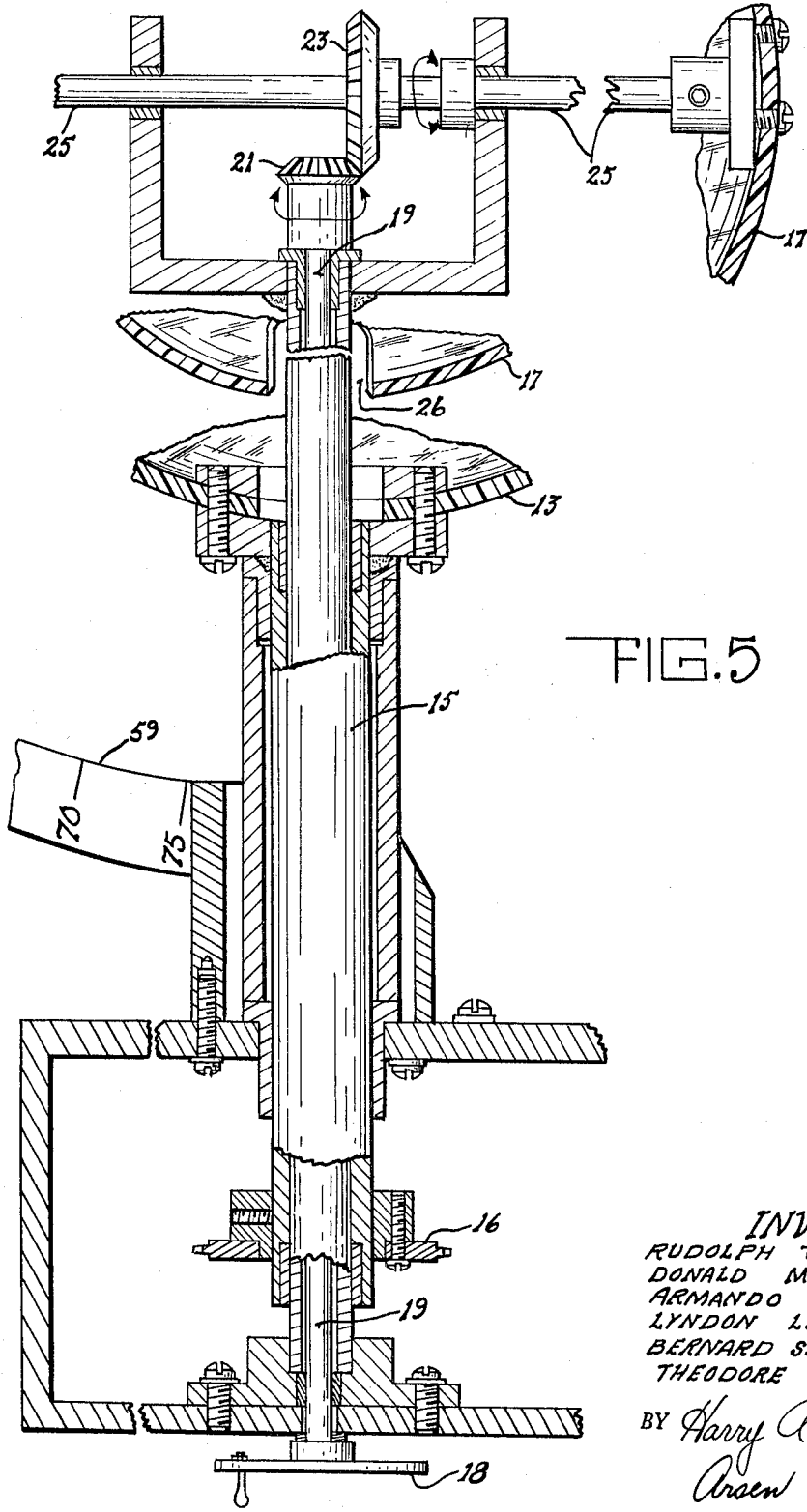
FIG. 5 is an enlarged view in section showing the details of the drive mechanism for rotating the geographical globe and the adjusting means for tilting the inner sphere.

The mechanisms heretofore described permit the simulation of the flight of a satellite about the earth. In combination with the flight simulator and an essential part of this invention, there is an inner sphere 17 disposed within the transparent earth globe 13. The inner sphere 17 comprises two hemispheres joined together, one of which is white in color and the other being black, the joining line being in a slightly inclined vertical plane. As shown in FIG. 3, by turning shaft 19, the angle of inclination of the black and white hemispheres can be changed to simulate the effect of the sun in producing simulated conditions of day and night for different seasons of the year at different points on the earth's surface.

As an added feature of the invention, through suitable electric circuitry (not shown) the spot 28 which represents the satellite can be made to light intermittently and thereby simulate the blinking lights with which some satellites are equipped. A current carrying brush in contact with a metallized portion of the satellite ring 27 is one means for energizing a small electric bulb located at the spot 29 and accomplishing the desired result.

In operation, the earth globe 13 turning on the shaft 15 rotates one revolution in twenty-four hours. The satellite ring 27 is set at the proper angle with respect to the earth globe 13 by sliding the support block 57 on the arcuate orbital ring support member 59 to the desired angular setting. This procedure permits the simulation of the satellite as it orbits the earth in its true orbital path. The satellite ring 27 is then set in motion to travel around the rotating earth globe 13 at a speed proportional to that of the satellite which is being monitored so that the time interval of each revolution of the ring 27 around the globe 13 is the same as that of the actual satellite. The spot 28 is positioned on the ring at a point which corresponds to the position of the actual satellite with respect to the earth itself. The inner sphere 17 is tilted to the proper angle to correspond to the season of the year during which the test is taking place by adjusting the handwheel 18. With the satellite monitor operating in the manner described, it is a simple matter to visually determine at any particular instant the exact position of the actual satellite over the earth and whether the satellite is passing through the daylight or night phase or somewhere in between. This latter feature is extremely important because if the position of the satellite is known when the earth is in a twilight or early dawn phase, visual observations of the actual satellite can be made from the earth. This is useful for photographic recordings and time synchronizing operations, particularly when the satellite is of the type equipped with intermittently flashing lights.

If it should be desired to determine where the actual satellite will be at some future date and time and where the satellite will be in the day or night phase, the variable speed motor 35 can be activated and its motion integrated with that of the constant speed motor 33 thereby speeding up the rotation of the earth globe 13 to a velocity of one revolution per minute instead of the normal one revolution per twenty-four hours. In this manner, it can be quickly and easily determined that the satellite will be visible from some particular place on earth at the predetermined future time. No lengthy computations, with the accompanying chance of error, is involved in making the determinations. Each of the clocks 49, being synchronized with the earth globe 13, will automatically indicate the proper future time at the several corresponding points on earth and the inner sphere 17 will indicate the day or night phase. After the necessary determinations have been made, the motor 35 may be reversed and the mechanism returned to its normal operation so that the several elements are in synchronism with the movement of the actual satellite as it orbits the earth.

It should be noted that the transparent geographical earth globe 13 is substantially spherical and rotates on a vertical axis while it is well known that, as a matter of fact, the earth itself does not rotate on a vertical axis, with respect to the sun in our solar system. However, for the purposes of this invention, this departure from reality is unimportant because we are primarily concerned with the relationship of the satellite with the earth itself. Further, the tilting feature of the inner sphere represents the sun's relationship to the earth.

From the foregoing, it will be seen that the invention has been presented with particular emphasis on a preferred embodiment. It will be apparent to one skilled in the art that certain changes, alterations, modifications and substitutions can be made in the arrangement and location of the various elements without departing from the true spirit and scope of the invention as defined in the amended claims.

What we claim is:

1. In a satellite orbital monitor for simulating the orbit of a planetary satellite for visual presentation, the combination of a rotatable geographical earth globe having a polar axis, first motive means operatively connected to said globe for rotation on said polar axis, a tiltable non-rotating inner sphere disposed concentrically within said globe, means for tilting said inner sphere such that a circumferential line therearound indicates the areas on earth which are in the twilight zone at specific times of day for a particular season of the year, a satellite ring having a simulated satellite thereon concentrically surrounding said globe and rotatable therearound, an elongate arcuate member substantially conforming to the curvature of said globe and fixedly attached to extend outwardly and upwardly from the lower axis terminal thereof, said satellite ring being slidable along said arcuate member for adjusting the angle of rotation of said satellite ring, second motive means operatively connected to said satellite ring for rotating said ring around said globe, said second motive means being independently adjustable to regulate the velocity of said satellite ring with respect to said globe, and control means for varying the velocity and direction of said satellite ring and said globe in proportionally equal amounts thereby visually projecting in time the location and observation conditions of the satellite.

2. The invention defined in claim 1 wherein the satellite ring having the simulated satellite thereon includes means for causing said simulated satellite to blink at predetermined time intervals in synchronism with an actual orbiting satellite, thereby providing precise world-wide instantaneous fixing of the location of a planetary satellite relative to a point on earth.

References Cited by the Examiner

UNITED STATES PATENTS

| | | | |
|---|---|---|---|
| 125,073 | 3/1872 | Niehaus | 58—43 |
| 2,026,368 | 12/1935 | Warren | 58—34 |
| 2,496,827 | 2/1950 | Tellier | 35—46 |
| 2,985,969 | 5/1961 | Farquhar | 35—47 |
| 3,014,287 | 12/1961 | Ernst | 35—47 |
| 3,028,687 | 4/1962 | Johnson | 35—46 |
| 3,197,893 | 8/1965 | Mariotti | 35—45 |
| 3,205,593 | 9/1965 | Busey | 35—46 |

EUGENE R. CAPOZIO, *Primary Examiner.*

H. S. SKOGQUIST, *Assistant Examiner.*